United States Patent Office 3,215,718
Patented Nov. 2, 1965

3,215,718
SULFUR-CONTAINING ORGANOSILICON COMPOUNDS AND METHOD OF PREPARATION
John W. Ryan, Midland, Mich., assignor to Dow Corning Corporation, Midland, Mich., a corporation of Michigan
No Drawing. Filed Nov. 24, 1961, Ser. No. 154,811
35 Claims. (Cl. 260—448.2)

This invention relates to silane and siloxane thiuronium salts, sulfur-containing siloxanes, cyclic silanes and spiranes and to methods for their preparation.

It is an object of this invention to prepare sulfur-containing siloxanes, cyclic silanes and spiranes. It is a further object to prepare novel silane and siloxane thiuronium salts which are useful in preparting sulfur-containing siloxanes. It is a further object to prepare novel copolymers containing units of these sulfur-containing siloxanes.

The novel silane thiuronium salts of this invention are of the general formula (1) 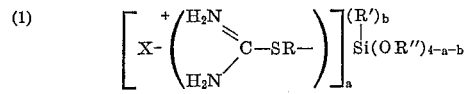

wherein X is a halogen atom selected from the group consisting of chlorine, bromine and iodine atoms, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom way from the silicon atom, R' is selected from the group consisting of alkyl, cycloalkyl, aralkyl, fluoroalkyl, fluoroaralkyl and fluorocycloalkyl radicals, R" is selected from the group consisting of alkyl and phenyl radicals and alkyl radicals containing oxygen in the form of

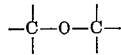

linkages, $a$ has a value of from 1 to 3 inclusive, $b$ has a value of from 0 to 2 inclusive and the total value of $a+b$ is from 1 to 3 inclusive.

Illustrative of these thiuronium salts are silane thiuronium chlorides, bromides, and iodides. R in the above formula is either an alkylene radical containing at least 3 carbon atoms or a cycloalkylene radical containing at least 4 carbon atoms. In each case the sulfur atom is attached to a carbon atom in R which is at least the third carbon atom away from the silicon atom. Illustrative of the alkylene radicals that R represents are
—CH₂CH₂CH₂—, —CH₂CH(CH₃)CH₂—

—CH₂CH(CH₂CH₃)CH₂—

—CH₂(CH₂)₄CH₂— and —CH₂(CH₂)₈CH₂—. Illustrative of the cycloalkylene radicals that R represents are

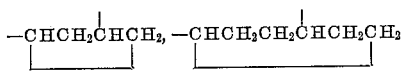

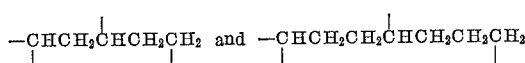

In each case, the sulfur atom is attached to a carbon atom in the alkylene or cycloalkylene radical which is at least the third carbon atom away from the silicon atom. Preferably, R is an alkylene radical of from 3 to 30 carbon atoms. Specific examples of R' are alkyl radicals, such as methyl, ethyl, t-butyl and octadecyl; cycloalkyl radicals such as cyclobutyl, cyclopentyl and cyclohexyl; aralkyl radicals such as benzyl and xylyl; fluoroalkyl radicals, such as 3,3,3-trifluoropropyl; fluoroaralkyl radicals, such as p-fluorobenzyl; and fluorocycloalkyl radicals such as 3-fluorocyclohexyl. Preferably, R' contains from 1 to 6 carbon atoms. R" is an alkyl or phenyl radical or an alkyl radical containing oxygen in the form of

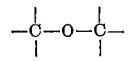

linkages, such as —CH₂CH₂OCH₂CH₃ and
—CH₂OCH₂CH₃

Preferably R" contains from 1 to 6 carbon atoms. The subscript $a$ has a value of from 1 to 3 inclusive and the subscript $b$ has a value of from 0 to 2 and the total value of $a+b$ is from 1 to 3 inclusive. Thus, there are from 1 to 3 inclusive OR" radicals per silicon atom.

These silane thiuronium salts are prepared by the reaction of thiourea with a halogenoalkyl- or halogenocycloalkylsilane in accordance with the general equation:

A)
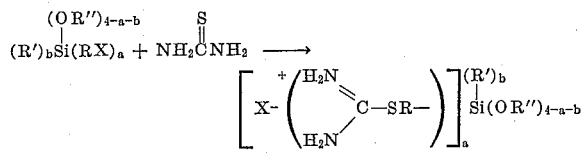

R, R', R", X and the subscripts $a$ and $b$ are as defined above. This reaction occurs when the silane and thiourea are added to a suitable solvent and heated at a temperature below the decomposition temperatures of the reactants. Temperatures between 80° and 200° C. are preferred. Any solvent in which the thiourea and silane are soluble and which does not interfere with the reaction can be used. Suitable solvents include alcohols and ketones. Obviously, the temperature of the reaction will depend upon the boiling point of the solvent used. The silane thiuronium salts can then be separated by any satisfactory means.

This invention relates to siloxane thiuronium salts of the unit formula (2) 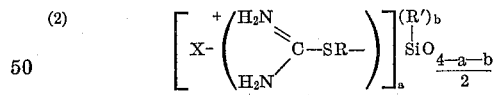

X, R, R' and the subscripts $a$ and $b$ are as defined above. The total value of $a+b$ is from 1 to 3 inclusive. These siloxane thiuronium salts are prepared by two methods. In one method, thiourea and a halogenoalkyl- or halogenocycloalkylsiloxane are reacted in accordance with the following equation:

(B) 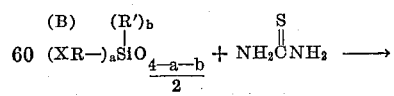

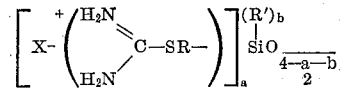

The same conditions used to effect the reaction represented by Equation A are used to effect this reaction.

These siloxane thiuronium salts are also produced by hydrolyzing and condensing a silane thiuronium salt (Formula 1). The techniques used to hydrolyze and condense conventional siloxanes are used to hydrolyze and condense the silane thiuronium salts.

This invention also relates to sulfur-containing siloxanes of the unit formula (3) 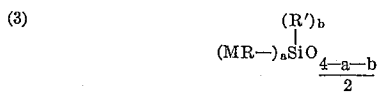

wherein M is selected from the group consisting of —SO$_3$H (sulfo), —SO$_3^-$NH$_4^+$ (ammonium-sulfo), and —SO$_2$Cl (chlorosulfonyl). R, R′ and the subscripts $a$ and $b$ are as defined above. Examples of such sulfur-containing siloxanes are

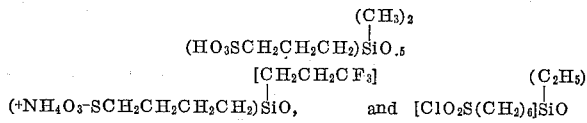

The sulfoalkyl- or sulfocycloalkylsiloxanes (i.e., those containing —SO$_3$H radicals) can be prepared by oxidizing a sulfur-containing compound of the unit formula

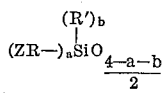

wherein Z is

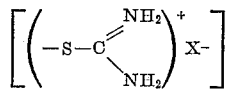

or —S—C≡N radical. X is a chlorine, bromine or iodine atom. The oxidation is carried out in the same manner for the thiocyanoalkylsiloxanes as for the siloxane thiuronium salts.

Oxidizing agents are used to effect this oxidation. The temperature of oxidation will depend upon the siloxane and oxidizing agent used. Although the oxidation can be conducted at low temperatures with oxidizing agents such as chlorine, higher temperatures are preferred when most other oxidizing agents are used. Temperatures at and above the temperature at which the silicon-bonded carbon atoms are cleaved must not be used. The exact temperature of oxidation will depend upon the siloxane and oxidizing agent used. The preferred temperature range is from 25° to 175° C. Although other oxidizing agents can be used, oxidizing agents stronger than iodine and weaker than fluorine (e.g., nitric acid, chlorine, bromine and potassium permanganate) are preferred. The preferred method is to conduct the oxidation at from 80° to 150° C. using nitric acid as the oxidizing agent.

Salts of these sulfoalkyl- or sulfocycloalkyl-siloxanes are prepared by the reaction of the sulfoalkyl- or sulfocycloalkylsiloxane with a base, such as sodium hydroxide, potassium hydroxide, ammonium hydroxide and the like or by treatment with ammonia. The following equation is illustrative of such a reaction:

(C) 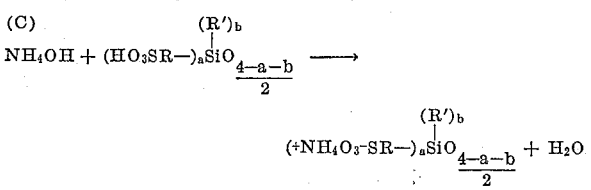

This reaction depicts a method for preparing ammonium sulfoalkylsiloxanes. It is preferable to use stoichiometric ratios of the base and siloxane in order to obtain good yields.

The siloxanes which contain chlorosulfonyl radicals (i.e., —SO$_2$Cl radicals) are prepared by reacting phosphorous pentachloride with a salt of a sulfoalkyl- or sulfocycloalkylsiloxane. It is preferable that this reaction not be carried out at excessive temperature in order to prevent the formation of chloroalkylsiloxanes. It should be pointed out that chlorosulfonylalkylchlorosilane is often one of the products obtained in this reaction. These chlorosilanes can be hydrolyzed and condensed to chlorosulfonylalkylsiloxanes, without disturbing the chlorosulfonyl radical, by carrying out the hydrolysis at low temperatures, preferably, at room temperature or below. If higher temperatures are used the original sulfoalkylsiloxane is obtained. It is preferable to use a large excess of water in the hydrolysis, so that only the silicon-chlorine bonds are attacked.

This invention also relates to sulfur-containing organosilicon compounds of the general formula (4) 

R and R′ are as defined above and $n$ has a value of 1 or 2. When $n$ is 1 the above compound is a cyclicsilane. When $n$ is 2 the above compound is a spirane.

These compounds (Formula 4) can be prepared by heating the sulfoalkyl- or sulfocycloalkylsiloxane and removing the water while heating. The water can be removed as it is produced by heating under a partial vacuum or by using a drying agent, such as P$_2$O$_5$. The preferred method for preparing these compounds is to heat the siloxane in a partial vacuum. Temperatures of from 100° to 175° C. are preferred. It is usually not necessary to conduct the reaction above 175° C. since it is only necessary to remove the water. The reaction can be conducted at temperatures below 100° C., especially when the reaction is conducted in a partial vacuum or with a drying agent.

This invention also relates to siloxanes consisting essentially of units of Formula 3 and units of the formula

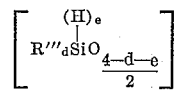

wherein R′′′ is selected from the group consisting of monovalent hydrocarbon and monovalent halogenated hydrocarbon radicals, $d$ has a value of from 1 to 3 inclusive, $e$ has an average value of from 0 to 1 inclusive and the total value of $d$ and $e$ is from 1 to 3 inclusive. Illustrative of the monovalent hydrocarbon radicals that R′′′ can represent are alkyl radicals; alkenyl radicals, such as vinyl, allyl, and butadienyl; cycloalkyl radicals; cycloalkenyl radicals such as cyclopentenyl and cyclohexenyl; aryl radicals such as xenyl and phenyl; and alkaryl radicals such as tolyl. R′′′ can also be any of the above types of radicals with halogen atoms attached thereto, e.g., chloromethyl, bromophenyl, trifluorotolyl, CF$_3$CH$_2$CH$_2$ and

C$_3$F$_7$CH$_2$CH$_2$

This copolymer can contain one or more species of

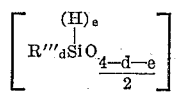

units. In this siloxane either one or different types of organic groups can be attached to each silicon atom. The preferred conventional siloxanes are

(CH$_3$)$_2$SiO and (CH$_3$)(C$_6$H$_5$)SiO.

These siloxane copolymers can be prepared by mixing and heating the conventional siloxane and the sulfoalkyl- or sulfocycloalkylsiloxane together. Temperatures of from 60° to 100° C. are usually satisfactory. These siloxane copolymers are also prepared by first hydrolyzing the sulfur-containing cyclic silanes and spiranes and then reacting with the conventional siloxanes. Another method of preparing these siloxane copolymers is by mixing and heating the sulfoalkyl- or sulfocycloalkyl siloxane and conventional cyclic siloxane. A convenient way of preparing the copolymers containing ammonium salts is to bubble ammonia vapors through the copolymer. Although the invention is not so limited it is theorized that the sulfo radical is a siloxane rearrangement catalyst in these reactions.

As indicated above, the silane thiuronium salts are useful in the preparation of siloxane thiuronium salts which are useful in the preparation of sulfur-containing siloxanes. The sulfur-containing siloxane homopolymers of this invention are useful in preparing the siloxane copolymers disclosed above. These copolymers are useful as water repellents. The methylhydrogen siloxane copolymers of this invention are in particular, useful as water-repellents for textiles.

Many of the sulfur-containing siloxane copolymers of this invention are useful in foaming certain solvents, as disclosed in the copending application of Daniel R. Pail Serial No. 154,813 filed November 24, 1961. Many of the sulfur-containing siloxane copolymers are also useful in preparing antifoamers and defoamers for use in aqueous systems as disclosed in the copending application of Daniel R. Pail, Gordon L. Axon and Richard W. Awe, Serial No. 154,814 filed November 24, 1961, now abandoned. The copolymers of this invention which are useful in foaming solvents are those which contain from 1.75 to 2.1 organic radicals per silicon atom and consist essentially of (A) from 0.45 to 12 mol percent units of the formula

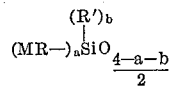

wherein M is selected from the group consisting of
$$-SO_3^- NH_4^+ \text{ and } -SO_3H$$

R is a divalent hydrocarbon radical selected from the group consisting of alkylene radicals containing from 3 to 30 inclusive carbon atoms and cycloalkylene radicals containing from 4 to 18 inclusive carbon atoms, wherein the sulfur atom is attached to a carbon atom in R which is at least the third carbon atom away from the silicon atom, R' is an alkyl radical from 1 to 4 inclusive carbon atoms and $a$ has an average value of from 1 to 3 inclusive, $b$ has an average value of from 0 to 2 inclusive and the total average value of $a+b$ is from 1 to 3 inclusive, and (B) from 88 to 99.55 mol percent units of the formula

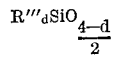

wherein R''' is an alkyl radical of from 1 to 4 inclusive carbon atoms and $d$ has a value of from 1.75 to 2.1 inclusive.

The copolymers of this invention which are useful in antifoamers are those which contain an average of from 1.75 to 2.1 organic radicals per silicon atom, said copolymer consisting essentially of from 0.04 to 4.5 mol percent units of the formula

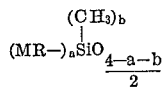

wherein M, R, $a$ and $b$ are as defined in the preceding paragraph, and from 95.5 to 99.96 mol percent units of the formula

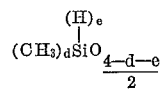

wherein $d$ has an average value of from 1 to 2.1 inclusive, $e$ has an average value of from 0 to 1 inclusive and the total value of $d+e$ is from 1.75 to 2.1 inclusive. The preferred copolymer for both uses is a copolymer containing

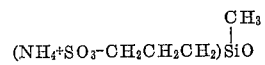

units and $(CH_3)_2SiO$ units.

The sulfo-containing cyclic silanes and spiranes of this invention are useful as polymerization catalysts for cyclic diorganosiloxanes.

The following examples are illustrative only and should not be construed as limiting the invention which is properly delineated in the appended claims.

*Example 1*

Thiourea (124 g., 1.63 mols) and 3-chloropropylmethylpolysiloxane (222 g., 1.63 mols) were refluxed over night in ethanol (400 ml.). The ethanol was then evaporated on a steam bath. A thiuronium salt of the unit formula

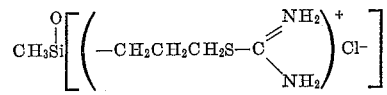

was obtained.

*Example 2*

The siloxane thiuronium salt prepared in Example 1 was dissolved in 100 g. of water and oxidized at about 100° C. by adding this solution to 10 mols of nitric acid in water. After oxidation, the product was freed of nitric acid and nitric oxides by adding concentrated hydrochloric acid and evaporation on a steam bath. The product was then dried over sodium hydroxide pellets in a desiccator. The product was identified as a sulfopropylsiloxane of the unit formula

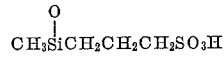

*Example 3*

Ethanol (800 ml.) and $[Cl(CH_2)_3Si(CH_3)_2]_2O$ (425.5 g., 1.48 mols) were placed in a 2000 ml. Soxhlet extraction flask. Thiourea (225 g., 2.96 mols) was placed on the glass wool in the extractor and the extraction was carried out for 2 days. The thiourea dissolved in the ethanol and was carried to the flask where it reacted with the disiloxane forming the water-soluble siloxane thiuronium chloride. The siloxane thiuronium chloride was stripped to 84° C. at 24 mm. pressure. The crude product was then dissolved in 700 g. of water and oxidized at reflux with concentrated nitric acid until gas evolution had stopped. After oxidation, 200 ml. of concentrated hydrochloric acid was added. The water and nitric oxides were then removed by distillation. The crude product was then distilled under vacuum at a pot temperature of 110° to 150° C. A 55 percent yield of a cyclic silane of the formula

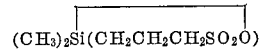

was obtained.

Example 4

A flask containing 600 ml. (9.6 mols) of concentrated nitric acid was heated to about 100° C. and 100 g. (0.6 mol of O[(CH₃)₂Si(CH₂)₃SCN]₂ was added over a 6 hour period. The water was evaporated on a steam bath and the excess nitric acid was then removed by adding concentrated hydrochloric acid to the solution. The residue was dried over sodium hydroxide pellets in a desiccator. The crude product was then distilled and 48 g. (45 percent yield) of a cyclic silane of the formula

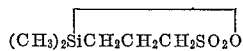

which distilled at 105° C. at 1 mm. was obtained. This cyclic silane is a deliquescent solid with an M.P. of 50 to 60° C.

The cyclic silane (0.1 g.) prepared above was added to 10 g. of a mixture of dimethylsiloxane tetramers and trimers. The cyclic sulfoalkylsilane was soluble at elevated temperatures in the dimethylsiloxane cyclics but crystallized out upon cooling. Upon standing over night the dimethylsiloxane cyclics had polymerized to an observable extent and the cyclic sulfopropylsilane was still insoluble. Upon standing for 3 days a methylsiloxane gum had formed.

The thiocyanopropyldimethylsiloxane used above as a starting material was prepared in the following manner: A mixture of a siloxane of the unit formula $$O[(CH_3)_2Si(CH_2)_3Cl]_2$$

(280 g., 1 mol), NaSCN (178 g., 2.2 mols) and ethanol (500 ml.) was heated over night at reflux. During this time a precipitate of NaCl formed. The mixture was then cooled, filtered and heated to evaporate the ethanol. The resulting liquid product was dissolved in diethyl ether and washed with water to remove any excess SCN ions. The ether was then removed by evaporation. The product was identified as a siloxane of the unit formula O[(CH₃)₂Si(CH₂)₃SCN]₂.

Example 5

Water was added to 0.3 g. of the cyclic sulfopropylsilane prepared in Example 4. The resulting $$O[(CH_3)_2Si(CH_2)_3SO_3H]_2$$

was added to 10 g. of a mixture of dimethylsiloxane tetramers and trimers. A viscous copolymer containing 98.8 mol percent units of the formula (CH₃)₂SiO and 1.2 mol percent units of the formula $$_{0.5}OSi(CH_3)_2CH_2CH_2CH_2SO_3H$$

was obtained.

Example 6

A 350 cs. dimethylsiloxane fluid (15 g.) was heated and stirred with a siloxane of the unit formula

(3.0 g.) until a cloudy gum formed. An additional 182 g. of the above dimethylsiloxane fluid was added and the reaction mass was heated until a hazy fluid formed. Ammonia vapors were then bubbled through the fluid. The copolymer was then heated on a steam bath to remove any excess ammonia. A copolymer containing 99.4 mol percent units of the formula

and .6 mol percent units of the formula

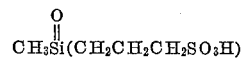

was obtained.

Example 7

A mixture of 50 cps. methylhydrogensiloxane fluid (41.9 g.) endblocked with trimethylsilyl units, dimethylsiloxane cyclic trimers and tetramers (41.9 g.)

(6.3 g.) and 50 ml. of isopropanol was heated at a temperature slightly below the reflux temperature until a clear solution formed. Ammonia vapors were then bubbled through the copolymer and the isopropanol was then evaporated. A copolymer containing 31 mol percent units of the formula (CH₃)₂SiO, 67 mol percent units of the formula

and 2 mol percent units of the formula

was obtained. This copolymer is a light yellow, crumbly, flowing solid.

Example 8

A mixture of dimethylsiloxane trimers and tetramers (75 g.) and

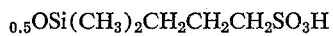

(25 g.) were stirred and heated together until the mixture became cloudy and viscous. Water (1.25 ml.) was then added and the stirring and heating continued. Ammonia vapors were then bubbled through the clear hot solution. A copolymer containing 87.8 mol percent dimethylsiloxane units and 12.2 mol percent units of the formula

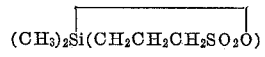

was obtained.

Example 9

The following siloxane thiuronium salts are prepared when the following halogenoalkyl- and halogenocycloalkyl siloxanes are substituted for the 3-chloropropylmethylsiloxane of Example 1 at the same ratio of thiourea to halogenoalkyl radicals. When the siloxane thiuronium salts are oxidized in accordance with the procedure of Example 2, the following sulfoalkyl- and sulfocycloalkyl siloxanes are produced. When ammonia is bubbled through these sulfo siloxanes, the corresponding ammonium salt is obtained. The following chlorosulfonylalkylsiloxanes are prepared when the ammonium sulfoalkylsiloxanes are reacted with a stoichiometric amount of phosphorous pentachloride and this product hydrolyzed at 10° C. with a large excess of water.

TABLE I

| A. Halogenoalkylsiloxane | B. Siloxane Thiuronium Salt | C. Sulfoalkylsiloxane |
|---|---|---|
| 1. $[Br(CH_2)_4]\underset{\underset{C_6H_{11}}{\mid}}{Si}O$ | $\left[Br^-\left(\underset{H_2N}{\overset{+H_2N}{\diagdown}}C-SCH_2CH_2CH_2CH_2-\right)\underset{\underset{C_6H_{11}}{\mid}}{Si}O\right]$ | $(C_6H_{11})\underset{\underset{O}{\parallel}}{Si}[(CH_2)_4SO_3H]$ |
| 2. $[I(CH_2)_3]\underset{\underset{CH_2C_6H_5}{\mid}}{Si}O$ | $\left[I^-\left(\underset{H_2N}{\overset{+H_2N}{\diagdown}}C-SCH_2CH_2CH_2-\right)\underset{\underset{CH_2C_6H_5}{\mid}}{Si}O\right]$ | $(C_6H_5CH_2)\underset{\underset{O}{\parallel}}{Si}[(CH_2)_3SO_3H]$ |
| 3. $\left(ClCH\underset{CH_2}{\overset{CH_2}{\diagup\diagdown}}CH-\right)\underset{\underset{CH_2CH_2CF_3}{\mid}}{Si}O$ | $\left[Cl^-\left(\underset{H_2N}{\overset{+H_2N}{\diagdown}}C-S-CH\underset{CH_2}{\overset{CH_2}{\diagup\diagdown}}CH-\right)\underset{\underset{CH_2CH_2CF_3}{\mid}}{Si}O\right]$ | $(CF_3CH_2CH_2)\underset{\underset{O}{\parallel}}{Si}\left[-CH\underset{CH_2}{\overset{CH_2}{\diagup\diagdown}}CHSO_3H\right]$ |
| 4. $[Cl(CH_2)_6]\underset{\underset{(CH_2C_6H_4F)}{\mid}}{Si}O$ | $\left[Cl^-\left(\underset{H_2N}{\overset{+H_2N}{\diagdown}}C-S(CH_2)_6\right)\underset{\underset{CH_2C_6H_4F}{\mid}}{Si}O\right]$ | $(FC_6H_4CH_2)\underset{\underset{O}{\parallel}}{Si}[(CH_2)_6SO_3H]$ |
| 5. $[Cl(CH_2)_3]\underset{\underset{C_6H_{10}F}{\mid}}{Si}O$ | $\left[Cl^-\left(\underset{H_2N}{\overset{+H_2N}{\diagdown}}C-SCH_2CH_2CH_2-\right)\underset{\underset{C_6H_{10}F}{\mid}}{Si}O\right]$ | $(FC_6H_{10})\underset{\underset{O}{\parallel}}{Si}[(CH_2)_3SO_3H]$ |
| 6. $(ClCHCH_2CH_2\overset{\mid}{C}HCH_2CH_2)\underset{\underset{C_6H_{13}}{\mid}}{Si}O$ | $\left[Br^-\left(\underset{H_2N}{\overset{+H_2N}{\diagdown}}C-SCHCH_2CH_2\overset{\mid}{C}HCH_2CH_2\right)\underset{\underset{C_6H_{13}}{\mid}}{Si}O\right]$ | $(C_6H_{13})\underset{\underset{O}{\parallel}}{Si}(CH_2CH_2\overset{\mid}{C}HCH_2CH_2CHSO_3H)$ |
| 7. $(ClCH_2CH_2CH_2)\underset{\underset{C_{18}H_{37}}{\mid}}{Si}O_{.5}$ | $\left[Cl^-\left(\underset{H_2N}{\overset{+H_2N}{\diagdown}}C-SCH_2CH_2CH_2\right)\underset{\underset{C_{18}H_{37}}{\mid}}{\overset{\mid}{Si}}O_{.5}\right]$ | $(CH_3)(C_{18}H_{37})\underset{\underset{O_{.5}}{\mid}}{Si}(CH_2CH_2CH_2SO_3H)$ |
| 8. $(ClCH_2CH_2CH_2)SiO_{1.5}$ | $\left[Cl^-\left(\underset{H_2N}{\overset{+H_2N}{\diagdown}}C-SCH_2CH_2CH_2\right)SiO_{1.5}\right]$ | $\underset{\underset{O_{1.5}}{\mid}}{Si}(CH_2CH_2CH_2SO_3H)$ |
| 9. $(ClCH_2CH_2CH_2)_3SiO_{.5}$ | $\left[Cl^-\left(\underset{H_2N}{\overset{+H_2N}{\diagdown}}C-SCH_2CH_2CH_2\right)SiO_{.5}\right]_3$ | $\underset{\underset{O_{.5}}{\mid}}{Si}(CH_2CH_2CH_2SO_3H)_3$ |

| D. Ammonium Sulfoalkylsiloxane | E. Chlorosulfonyl Alkylsiloxane |
|---|---|
| 1. $(C_6H_{11})\underset{\underset{O}{\parallel}}{Si}[(CH_2)_4SO_3^-NH_4^+]$ | $(C_6H_{11})\underset{\underset{O}{\parallel}}{Si}[(CH_2)_4SO_2Cl]$ |
| 2. $(C_6H_5CH_2)\underset{\underset{O}{\parallel}}{Si}[(CH_2)_3SO_3^-NH_4^+]$ | $(C_6H_5CH_2)\underset{\underset{O}{\parallel}}{Si}[(CH_2)_3SO_2Cl]$ |
| 3. $(CF_3CH_2CH_2)\underset{\underset{O}{\parallel}}{Si}\left[-CH\underset{CH_2}{\overset{CH_2}{\diagup\diagdown}}CHSO_3^-NH_4^+\right]$ | $(CF_3CH_2CH_2)\underset{\underset{O}{\parallel}}{Si}\left[-CH\underset{CH_2}{\overset{CH_2}{\diagup\diagdown}}CHSO_2Cl\right]$ |
| 4. $(FC_6H_4CH_2)\underset{\underset{O}{\parallel}}{Si}[(CH_2)_6SO_3^-NH_4^+]$ | $(FC_6H_4CH_2)\underset{\underset{O}{\parallel}}{Si}[(CH_2)_6SO_2Cl]$ |
| 5. $(FC_6H_{10})\underset{\underset{O}{\parallel}}{Si}[(CH_2)_3SO_3^-NH_4^+]$ | $(FC_6H_{10})\underset{\underset{O}{\parallel}}{Si}[(CH_2)_3SO_2Cl]$ |
| 6. $(C_6H_{13})\underset{\underset{O}{\parallel}}{Si}(CH_2CH_2\overset{\mid}{C}HCH_2CH_2CHSO_3^-NH_4^+)$ | $(C_6H_{13})\underset{\underset{O}{\parallel}}{Si}(CH_2CH_2\overset{\mid}{C}HCH_2CH_2CHSO_2Cl)$ |
| 7. $(CH_3)(C_{18}H_{37})\underset{\underset{O_{.5}}{\mid}}{Si}(CH_2CH_2CH_2SO_3^-NH_4^+)$ | $(CH_3)(C_{18}H_{37})\underset{\underset{O_{.5}}{\mid}}{Si}(CH_2CH_2CH_2SO_2Cl)$ |
| 8. $\underset{\underset{O_{1.5}}{\mid}}{Si}(CH_2CH_2CH_2SO_3^-NH_4^+)$ | $\underset{\underset{O_{1.5}}{\mid}}{Si}(CH_2CH_2CH_2SO_2Cl)$ |
| 9. $\underset{\underset{O_{.5}}{\mid}}{Si}(CH_2CH_2CH_2SO_3^-NH_4^+)_3$ | $\underset{\underset{O_{.5}}{\mid}}{Si}(CH_2CH_2CH_2SO_2Cl)_3$ |

Example 10

The following silane thiuronium salts are prepared when the following halogenoalkyl- and halogenocycloalkyl silanes are substituted for the 3-chloropropylmethylsiloxane of Example 1 at the same ratio of thiourea to halogenoalkyl radicals and the procedure of Example 1 is followed. When these silane thiuronium salts are hydrolyzed, the following siloxane thiuronium salts are obtained.

TABLE II

| Halogenoalkylsilane | Silane Thiuronium Salt | Siloxane Thiuronium Salt |
|---|---|---|
| 1. $ClCH_2CH_2CH_2\overset{(CH_3)_2}{\underset{\mid}{Si}}(OC_6H_5)$ | $\left[Cl^-\left(\overset{+}{\underset{H_2N}{\overset{H_2N}{\diagup}}}\hspace{-4pt}\diagdown C-SCH_2CH_2CH_2-\right)\right]\overset{(CH_3)_2}{\underset{\mid}{Si}}(OC_6H_5)$ | $\left[Cl^-\left(\overset{+}{\underset{H_2N}{\overset{H_2N}{\diagup}}}\hspace{-4pt}\diagdown CSCH_2CH_2CH_2-\right)\right]\overset{(CH_3)_2}{\underset{\mid}{SiO.5}}$ |
| 2. $ClC\overset{CH_2}{\underset{CH_2}{\diagup\!\!\!\diagdown}}CH\overset{C_6H_{11}}{\underset{\mid}{Si}}(OC_2H_5)_2$ | $\left[Cl^-\left(\overset{+}{\underset{H_2N}{\overset{H_2N}{\diagup}}}\hspace{-4pt}\diagdown C-SCH\overset{CH_2}{\underset{CH_2}{\diagup\!\!\!\diagdown}}CH-\right)\right]\overset{C_6H_{11}}{\underset{\mid}{Si}}[OC_2H_5]_2$ | $\left[Cl^-\left(\overset{+}{\underset{H_2N}{\overset{H_2N}{\diagup}}}\hspace{-4pt}\diagdown CSCH\overset{CH_2}{\underset{CH_2}{\diagup\!\!\!\diagdown}}CH-\right)\right]\overset{C_6H_{11}}{\underset{\mid}{SiO}}$ |
| 3. $(ClCH_2CH_2CH_2)_3Si(OCH_2CH_2OCH_3)$ | $\left[Cl^-\left(\overset{+}{\underset{H_2N}{\overset{H_2N}{\diagup}}}\hspace{-4pt}\diagdown C-SCH_2CH_2CH_2-\right)\right]_3 Si(OCH_2CH_2-OCH_3)$ | $\left[Cl^-\left(\overset{+}{\underset{H_2N}{\overset{H_2N}{\diagup}}}\hspace{-4pt}\diagdown CSCH_2CH_2CH_2-\right)\right]_3 SiO.5$ |
| 4. $(ClCH_2CH_2CH_2)Si(OCH_3)_3$ | $\left[Cl^-\left(\overset{+}{\underset{H_2N}{\overset{H_2N}{\diagup}}}\hspace{-4pt}\diagdown C-SCH_2CH_2CH_2-\right)\right] Si(OCH_3)_3$ | $\left[Cl^-\left(\overset{+}{\underset{H_2N}{\overset{H_2N}{\diagup}}}\hspace{-4pt}\diagdown CSCH_2CH_2CH_2-\right)\right] SiO_{1.5}$ |

*Example 11*

The following sulfoalkyl cyclic silanes and spiranes are obtained when the following halogenoalkyl siloxanes are substituted for the 3-chloropropyldimethylsiloxane of Example 3 at the same ratio of thiourea to halogenoalkyl radicals.

TABLE III

| Halogenoalkyl Siloxane | Sulfoalkyl Cyclic Silane or Spirane |
|---|---|
| 1. $[Cl(CH_2)_6]\overset{[CH_2CH_2CF_3]_2}{\underset{\mid}{Si}}O.5$ | $(CF_3CH_2CH_2)_2Si[\overline{(CH_2)_6SO_2O]}$ |
| 2. $[Cl(CH_2)_4]\overset{(C_3H_7)_2}{\underset{\mid}{Si}}O_{.55}$ | $(C_3H_7)_2Si\overline{(CH_2CH_2CH_2CH_2SO_2O)}$ |
| 3. $[Cl(CH_2)_3]_2SiO$ | $(\overline{OO_2SCH_2CH_2CH_2})Si\overline{(CH_2CH_2SO_2O)}$ |

*Example 12*

The following copolymers are prepared when the following siloxanes are substituted for the siloxanes used in Example 6 at the following mol ratio and the procedure of Example 6 is followed.

TABLE IV

| | Mol Percent | Conventional Siloxane | Mol Percent | Sulfoalkylsiloxane | Mol Percent | Siloxane Copolymeric Units |
|---|---|---|---|---|---|---|
| 1 | 50 | Hydroxy end-blocked phenylmethylsiloxane. | 50 | $(C_6H_{11})\overset{O}{\underset{\mid}{Si}}(CH_2CH_2CH_2CH_2SO_3H)$ | 50 | $\overset{C_6H_{11}}{\underset{\mid}{SiO}}$ $(CH_2CH_2CH_2CH_2SO_3^-NH_4^+)$ and |
| | | | | | 50 | $\overset{CH_3}{\underset{C_6H_5}{\overset{\mid}{SiO}}}$ |
| 2 | 75 | $\overset{CH_2CH_2CF_3}{\underset{CH_3}{\overset{\mid}{SiO}}}$ | 25 | $(CF_3CH_2CH_2)\overset{O}{\underset{\mid}{Si}}(CH\overset{CH_2}{\underset{CH_2}{\diagup\!\!\!\diagdown}}CHSO_3H)$ | 75 | $\overset{(CH_2CH_2CF_3)}{\underset{CH_3}{\overset{\mid}{SiO}}}$ and |
| | | | | | 25 | $(CF_3CH_2CH_2)\overset{O}{\underset{\mid}{Si}}(CH\overset{CH_2}{\underset{CH_2}{\diagup\!\!\!\diagdown}}CHSO_3^-NH_4^+)$ |

TABLE IV—Continued

| | Mol Percent | Conventional Siloxane | Mol Percent | Sulfoalkylsiloxane | Mol Percent | Siloxane Copolymeric Units |
|---|---|---|---|---|---|---|
| 3 | 10 | $(CH_3)_3SiO_{.5}$ | 90 | $\overset{O_{1.5}}{\underset{|}{Si}}(CH_2CH_2CH_2SO_3H)$ | 10 | $(CH_3)_3SiO_{.5}$ |
| | | | | | | and |
| | | | | | 90 | $\overset{O_{1.5}}{\underset{|}{Si}}(CH_2CH_2CH_2SO_3^-NH_4^+)$ |
| 4 | 10 | $(C_2H_5)SiO_{1.5}$ | 90 | $(CH_3)(C_{18}H_{37})\overset{O_{.5}}{\underset{|}{Si}}(CH_2CH_2CH_2SO_3H)$ | 10 | $(C_2H_5)SiO_{1.5}$ |
| | | | | | | and |
| | | | | | 90 | $(CH_3)(C_{18}H_{37})\overset{O_{.5}}{\underset{|}{Si}}(CH_2CH_2CH_2SO_3^-NH_4^+)$ |
| 5 | 50 | $\overset{CH=CH_2}{\underset{\underset{CH_3}{\vert}}{Si}}O$ | 50 | $(C_3H_7)\overset{O}{\underset{\vert}{Si}}(CH_2CH_2CH_2SO_3H)$ | 50 | $\overset{CH=CH_2}{\underset{\underset{CH_3}{\vert}}{Si}}O$ |
| | | | | | | and |
| | | | | | 50 | $(C_3H_7)\overset{O}{\underset{\vert}{Si}}(CH_2CH_2CH_2SO_3^-NH_4^+)$ |

That which is claimed is:

1. A silane thiuronium salt of the general formula $$\left[X^-\left(\begin{array}{c}{}^+\!H_2N\\ \\H_2N\end{array}\!\!\!\!\!\!\!\!>\!\!\!C-SR-\right)_a Si(OR'')_{4-a-b}(R')_b\right]$$

wherein X is a halogen atom selected from the group consisting of chlorine, bromine and iodine atoms, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, cycloalkyl, aralkyl, fluoroalkyl, fluoroaralkyl and fluorocycloalkyl radicals, R'' is selected from the group consisting of alkyl and phenyl radicals and alkyl radicals containing oxygen in the form of $$-\overset{|}{\underset{|}{C}}-O-\overset{|}{\underset{|}{C}}-$$

linkages, $a$ has a value of from 1 to 3 inclusive and $b$ has a value of from 0 to 2 inclusive and the total value of $a+b$ is from 1 to 3 inclusive.

2. A silane thiuronium salt of claim 1, wherein X is a chlorine atom, R is an alkylene radical containing at least 3 carbon atoms wherein the sulfur atom is attached to a carbon atom in R which is at least the third carbon atom away from the silicon atom and R' and R'' are alkyl radicals.

3. A silane thiuronium salt of the formula

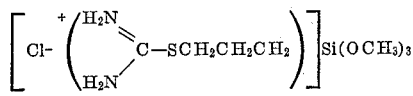

4. A silane thiuronium salt of the formula

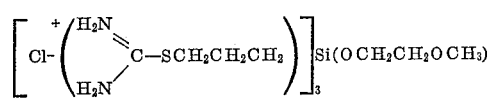

5. A silane thiuronium salt of the formula

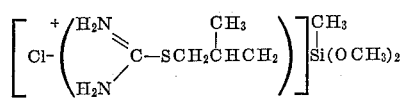

6. A siloxane thiuronium salt of the unit formula

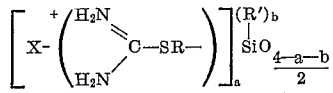

wherein X is a halogen atom selected from the group consisting of chlorine, bromine and iodine atoms, R is selected from the group consisting of alkylene radicals containing at least carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals, $a$ has a value of from 1 to 3 inclusive, $b$ has a value of from 0 to 2 inclusive and the total value of $a+b$ is from 1 to 3 inclusive.

7. The siloxane thiuronium salt of claim 6, wherein X is a chlorine atom, R is an alkylene radical containing at least 3 carbon atoms wherein the sulfur atom is attached to a carbon atom in R which is at least the third carbon atom away from the silicon atom and R' is an alkyl radical.

8. A siloxane thiuronium salt of the unit formula

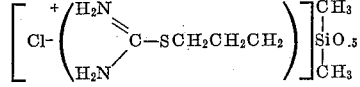

9. A siloxane thiuronium salt of the unit formula

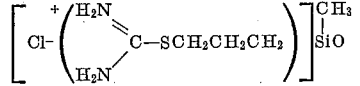

10. A siloxane thiuronium salt of the unit formula

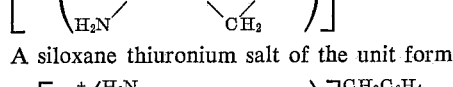

11. A siloxane thiuronium salt of the unit formula

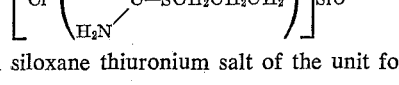

12. A siloxane thiuronium salt of the unit formula

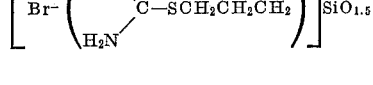

13. A sulfur-containing siloxane of the unit formula $$(MR{-})_a \underset{\underset{(R')_b}{|}}{Si} O_{\frac{4-a-b}{2}}$$

wherein M is selected from the group consisting of —SO₃H and —SO₃⁻NH₄⁺, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals, $a$ has a value of from 1 to 3 inclusive, $b$ has a value of from 0 to 2 inclusive and the total of $a+b$ is from 1 to 3 inclusive.

14. The sulfur-containing siloxane of claim 13, wherein M is —SO₃H, R is an alkylene radical containing at least 3 carbon atoms, wherein the sulfur atom is attached to a carbon atom in R which is at least the third carbon atom away from the silicon atom and R' is an alkyl radical.

15. A sulfur-containing siloxane of the unit formula $$(MR{-})_2 \underset{\underset{(R')_b}{|}}{Si} O_{\frac{2-b}{2}}$$

wherein M is selected from the group consisting of —SO₃H and —SO₃⁻NH₄+, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals, and $b$ has a value of from 0 to 1 inclusive.

16. A sulfur-containing siloxane of the unit formula (MR—)₃SiO₀.₅, wherein M is selected from the group consisting of —SO₃H and —SO₃⁻NH₄⁺, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom.

17. A sulfopropylsiloxane of the unit formula $$[HO_3S(CH_2)_3]\underset{\underset{CH_3}{|}}{\overset{\overset{CH_3}{|}}{Si}}O_{.5}$$

18. A sulfur-containing siloxane of the unit formula

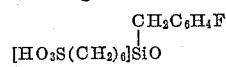

19. A sulfur-containing siloxane of the unit formula $$[HO_3S(CH_2)_6]\underset{\underset{CH_2C_6H_4F}{|}}{Si}O$$

20. A sulfur-containing organosilicon compound of the general formula $$\underset{\underset{(-RSO_2O)_n}{|}}{\overset{\overset{(R')_{4-2n}}{|}}{Si}}$$

wherein R is selected from the group consisting of alkylene radicals containing at least 3 carbon atoms and cycloalkylene radicals containing at least 4 carbon atoms wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals and $n$ is an integer of from 1 to 2, inclusive.

21. The sulfur-containing organosilicon compound of claim 20 wherein $n$ has a value of 1.

22. The sulfur-containing organosilicon compound of claim 20, wherein R is an alkylene radical containing at least 3 carbon atoms wherein the sulfur atom is attached to a carbon atom in R which is at least the third carbon atom away from the silicon atom, R' is an alkyl radical and $n$ has a value of 1.

23. A sulfur-containing organosilicon cyclic compound of the formula $$\underset{\underset{|\underline{\qquad\qquad\qquad\qquad}|}{Si(CH_2CH_2CH_2SO_2O)}}{\overset{\overset{(CH_3)_2}{|}}{}}$$

24. A siloxane consisting essentially of at least one unit of the Formula A $$(MR{-})_a \underset{\underset{(R')_b}{|}}{Si} O_{\frac{4-a-b}{2}}$$

wherein M is selected from the group consisting of —SO₃H and —SO₃⁻NH₄⁺, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl, and fluorocycloalkyl radicals, $a$ has a value of from 1 to 3 inclusive, $b$ has a value of from 0 to 2 inclusive and the total value of $a$ and $b$ is from 1 to 3 inclusive and units of the Formula B $$R'''_d\underset{\underset{(H)_e}{|}}{Si}O_{\frac{4-d-e}{2}}$$

wherein R''' is selected from the group consisting of monovalent hydrocarbon and monovalent halogenated hydrocarbon radicals, $d$ has a value of from 1 to 3 inclusive, $e$ has a value of from 0 to 1 inclusive and the total value of $d$ and $e$ is from 1 to 3 inclusive.

25. The siloxane of claim 24, wherein M is a

—SO₃⁻NH₄⁺

R is an alkylene radical containing at least 3 carbon atoms wherein the sulfur atom is attached to a carbon atom in R which is at least the third carbon atom away from the silicon atom, R' is an alkyl radical and R''' is a monovalent hydrocarbon radical.

26. A siloxane consisting essentially of (A) from 0.04 to 12 mol percent units of the formula $$(MR{-})_a \underset{\underset{(R')_b}{|}}{Si} O_{\frac{4-a-b}{2}}$$

wherein M is selected from the group consisting of —SO₃H and —SO₃⁻NH₄⁺, R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals, $a$ has a value of from 1 to 3 inclusive, $b$ has a value of from 0 to 2 inclusive and the total value of $a$ and $b$ is from 1 to 3 inclusive and (B) from 88 to 99.96 mol percent units of the formula $$R'''_d\underset{\underset{(H)_e}{|}}{Si}O_{\frac{4-d-e}{2}}$$

wherein R''' is selected from the group consisting of monovalent hydrocarbon and monovalent halogenated hydrocarbon radicals, $d$ has a value of from 1 to 3 inclusive, $e$ has a value of from 0 to 1 inclusive and the total value of $d$ and $e$ is from 1 to 3 inclusive.

27. A sulfur-containing siloxane copolymer consisting essentially of (A) from 0.45 to 12 mol percent units of the formula

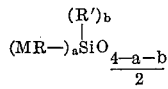

wherein M is selected from the group consisting of $-SO_3^-NH_4^+$ and $-SO_3H$, R is a divalent hydrocarbon radical selected from the group consisting of alkylene radicals containing from 3 to 30 inclusive carbon atoms and cycloalkylene radicals containing from 4 to 18 inclusive carbon atoms, wherein the sulfur atom is attached to a carbon atom in R which is at least the third carbon atom away from the silicon atom, R' is an alkyl radical from 1 to 4 inclusive carbon atoms and $a$ has an average value of from 1 to 3 inclusive, $b$ has an average value of from 0 to 2 inclusive and the total average value of $a+b$ is from 1 to 3 inclusive, and (B) from 88 to 99.55 mol percent units of the formula

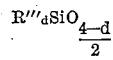

wherein R''' is an alkyl radical of from 1 to 4 inclusive carbon atoms and $d$ has a value of from 1.75 to 2.1 inclusive, said siloxane copolymer having an average of from 1.75 to 2.1 organic radicals per silicon atom.

28. A sulfur-containing siloxane copolymer consisting essentially of (A) from 0.04 to 4.5 mol percent units of the formula

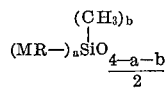

wherein M is selected from the group consisting of $-SO_3^-NH_4^+$ and $-SO_3H$, R is a divalent hydrocarbon radical selected from the group consisting of alkylene radicals containing from 3 to 30 inclusive carbon atoms and cycloalkylene radicals containing from 4 to 18 inclusive carbon atoms, wherein the sulfur atom is attached to a carbon atom in R which is at least the third carbon atom away from the silicon atom, $a$ has an average value of from 1 to 3 inclusive, $b$ has an average value of from 0 to 2 inclusive and the total average value of $a+b$ is from 1 to 3 inclusive, and (B) from 95.5 to 99.96 mol percent units of the formula

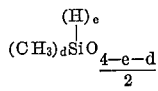

wherein $d$ has an average value of from 1 to 2.1 inclusive, $e$ has an average value of from 0 to 1 inclusive and the total value of $d+e$ is from 1.75 to 2.1 inclusive, said siloxane copolymer having an average of from 1.75 to 2.1 organic radicals per silicon atom.

29. A siloxane consisting essentially of (A) from 0.04 to 12 mol percent units of the formula

and (B) from 88 to 99.96 mol percent units of the formula $(CH_3)_2SiO$.

30. A siloxane consisting essentially of (A) from 0.04 to 12 mol percent units of the formula

and (B) from 88 to 99.96 mol percent units of the formula $(CH_3)(C_6H_5)SiO$.

31. A method for preparing a compound of the general formula

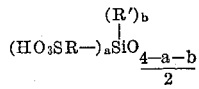

wherein R is selected from the group consisting of alkylene radicals containing at least 3 carbon atoms and cycloalkylene radicals containing at least 4 carbon atoms, wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl and fluorocycloalkyl radicals, $a$ has a value of from 1 to 3 inclusive, $b$ has a value of from 0 to 2 inclusive and the total value of $a+b$ is from 1 to 3 inclusive, which comprises (1) oxidizing in the presence of an oxidizing agent stronger than iodine and weaker than fluorine at from 25° to 175° C. a compound of the general formula

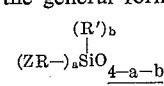

wherein R, R', $a$ and $b$ are as defined above and Z is selected from the group consisting of

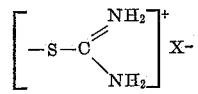

and $-S-C\equiv N$, wherein X is a halogen atom selected from the group consisting of chlorine, bromine and iodine atoms, and (2) thereafter separating the desired product.

32. The method of claim 31 wherein R is an alkylene radical containing at least 3 carbon atoms, wherein the sulfur atom is attached to a carbon atom in R which is at least the third carbon atom away from the silicon atom, R' is an alkyl radical and Z is

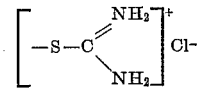

33. A method for preparing a compound of the general formula

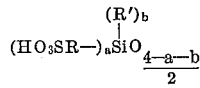

wherein R is selected from the group consisting of alkylene radicals containing at least 3 carbon atoms and cycloalkylene radicals containing at least 4 carbon atoms, wherein the sulfur atom is attached to a carbon in R which is at least the third carbon atom away from the silicon atom, R' is selected from the group consisting of alkyl, aralkyl, cycloalkyl, fluoroalkyl, fluoroaralkyl and fluorocycloalkyl, fluoroaralkyl and fluorocycloalkyl radicals, $a$ has a value of from 1 to 3 inclusive, $b$ has a value of from 0 to 3 inclusive and the total value of $a+b$ is from 1 to 3 inclusive, which comprises (1) dissolving in water a compound of the general formula

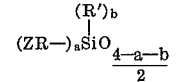

wherein R, R', $a$ and $b$ are as defined above and Z is selected from the group consisting of

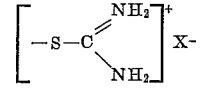

and $-S-C\equiv N$, wherein X is a halogen atom selected from the group consisting of chloroine, bromine and iodine atoms, (2) adding the solution formed in (1) to an oxidizing agent stronger than iodine and weaker than fluorine in a water solution, (3) adjusting the solution formed in (2) to a temperature of oxidation at from 25° to 175° C., and (4) thereafter separating the desired product.

34. A method for preparing a sulfur-containing organosilicon compound of the general formula $$\underset{\underset{\underline{\qquad\qquad}}{Si[-RSO_2O]_n}}{(R')_{4-2n}}$$

wherein R is selected from the group consisting of alkylene radicals containing at least 3 carbon atoms and cycloalkylene radicals containing at least 4 carbon atoms wherein the sulfur atom is attached to a carbon atom in R which is at least the third carbon atom away from the silicon atom, R' is selected from the group consisting of alkyl, aralkyl, cycloalkyl, fluoroalkyl, fluoroaralkyl, and fluorocycloalkyl radicals and $n$ is an integer of from 1 to 2, inclusive, which comprises heating and removing the water resulting from heating a compound of the general formula $$(HO_3SR-)_n \underset{}{\overset{(R')_{4-2n}}{Si}} O_{\frac{n}{2}}$$

wherein R, R' and $n$ are as defined above.

35. A method for preparing a sulfur-containing cyclic organosilicon compound of the general formula $$\underset{\underline{\qquad\qquad}}{\overset{(R')_2}{Si(RSO_2O)}}$$

wherein R is an alkylene radical containing at least three carbon atoms wherein the sulfur atom is attachced to a carbon atom in R which is at least the third carbon atom away from the silicon atom, and R' is an alkyl radical, which comprises heating under a partial vacuum a compound of the general formula $$(HO_3SR-)\overset{(R')_2}{Si}O_{.5}$$

wherein R and R' are as defined above.

References Cited by the Examiner
UNITED STATES PATENTS

| | | | |
|---|---|---|---|
| 2,719,165 | 9/55 | Cooper | 260—448.2 |
| 2,789,121 | 4/57 | Cooper | 260—448.2 |
| 2,955,128 | 10/60 | Bailey | 260—448.2 |
| 2,968,643 | 1/61 | Bailey | 260—448.2 |

OTHER REFERENCES

Burkhard, "Jour. American Chem. Soc.," vol. 72, March 1950, pages 1078–80.

Gilman et al., "Jour. American Chem. Soc.," vol. 75, August 1953, pages 3760–2.

Nozakura, "Bull. Chem. Soc. Japan," vol. 28 (1955), pp. 299–304 (52 Chem. Abstr. 3667).

Nozakura, "Nippon Kagaku Zasshi," vol. (1954), pp. 958–61 (51 Chem. Abstr. 14543).

Tiers et al., "Journal of Organic Chemistry," vol. 26 (June 1961), pp. 2097–8.

TOBIAS E. LEVOW, *Primary Examiner.*

MILTON STERMAN, SAMUEL H. BLECH, *Examiners.*